United States Patent
Strong (10) Patent No.: US 9,846,103 B2
(45) Date of Patent: Dec. 19, 2017

(54) OILFIELD CONDUIT LEAKAGE DETECTION SYSTEM

(75) Inventor: Andrew Strong, Hampshire (GB)

(73) Assignee: Schlumberger Technology Corporation, Houston, TX (US)

( * ) Notice: Subject to any disclaimer, the term of this patent is extended or adjusted under 35 U.S.C. 154(b) by 1431 days.

(21) Appl. No.: 13/695,613

(22) PCT Filed: May 12, 2011

(86) PCT No.: PCT/EP2011/057675
§ 371 (c)(1),
(2), (4) Date: Dec. 17, 2012

(87) PCT Pub. No.: WO2011/141537
PCT Pub. Date: Nov. 17, 2011

(65) Prior Publication Data
US 2013/0090867 A1     Apr. 11, 2013

Related U.S. Application Data (60) Provisional application No. 61/333,781, filed on May 12, 2010.

(51) Int. Cl.
*G01F 17/00*     (2006.01)
*G01M 3/00*     (2006.01)
(Continued)

(52) U.S. Cl.
CPC ............ *G01M 3/007* (2013.01); *G01M 3/002* (2013.01); *G01M 3/2892* (2013.01); *G06F 15/00* (2013.01)

(58) Field of Classification Search
None
See application file for complete search history.

(56) References Cited

U.S. PATENT DOCUMENTS

| | | | |
|---|---|---|---|
| 5,453,944 A | * | 9/1995 | Baumoel ................ G01F 1/668 700/281 |
| 5,918,641 A | | 7/1999 | Hardy et al. |

(Continued)

FOREIGN PATENT DOCUMENTS

| | | |
|---|---|---|
| DE | 10215064 | 11/2002 |
| WO | 2009/070769 | 6/2009 |
| WO | 2009/158630 | 12/2009 |

OTHER PUBLICATIONS

G. Geiger, "State-of-the-art in leak detection and localization", Pipeline Technology 2006 Conference, Dec. 2006, pp. 1-25.

*Primary Examiner* — Aditya Bhat
(74) *Attorney, Agent, or Firm* — Chamberlain Hrdlicka (57) ABSTRACT

A system and method for identifying and measuring the quantity of leakage from a conduit used in the conveyance of a fluid, such as a hydrocarbon fluid, for example oil, or a gas, such as natural gas. The system includes a measurement device configured to measure a distributed temperature along a length of the conduit. The system further includes a processor configured to calculate a change in volume of the fluid in the conduit for each of a plurality of sections of the length of the conduit based on the distributed temperature. The processor is further configured to calculate a correction factor based on the change in volume of the fluid. The processor is also configured to calculate a corrected mass-balance differential using the correction factor, and compare the corrected mass-balance differential to a predetermined leakage threshold to identify whether a leak exists in the conduit.

20 Claims, 5 Drawing Sheets

(51) Int. Cl.
 *G01M 3/28* (2006.01)
 *G06F 15/00* (2006.01)

(56) References Cited

U.S. PATENT DOCUMENTS

| | | | |
|---|---|---|---|
| 7,296,480 B2 | 11/2007 | de Aquino | |
| 8,520,195 B2 * | 8/2013 | Ramos | G01D 5/3537 356/72 |
| 2007/0131297 A1 * | 6/2007 | Spaolonzi | G01M 3/047 138/104 |

* cited by examiner

OILFIELD CONDUIT LEAKAGE DETECTION SYSTEM

CROSS-REFERENCE TO RELATED APPLICATION

The present invention claims the benefit of priority of U.S. Provisional Application Ser. No. 61/333,781, filed on May 12, 2010, the contents of which are incorporated by reference in their entirety herein.

FIELD OF THE INVENTION

The invention relates to a system and method for identifying a leak and, more particularly, to a system and method for identifying and measuring the quantity of leakage from a conduit used in the conveyance of a fluid, such as a hydrocarbon fluid, for example oil, or a gas, such as natural gas.

BACKGROUND

The complexity of structures, for example, used in oil and gas subsea exploration, is increasing to satisfy the many requirements in terms of thermal behaviour, geometry, multiple fluid flows, flexibility and mechanical characteristics. For example, some umbilicals or risers can be used to connect wells or facilities at the sea bed to, for example, floating facilities at the sea surface. Further examples of such structures include manifolds, separators and control units. It is desirable to monitor such connections in order to prevent structural failure due to fatigue, corrosion, erosion or blockage, which can be caused by the deposition of parts of the flow components (e.g., such as wax, hydrates, scales, asphaltenes, and the like).

Damage to such structures also can be due to human activity, such as fishing or laying and removal of anchors. Damage can also be the result of excessive stresses or shocks during transportation or deployment. Manufacturing defects can also compromise the quality of such structures.

For such reasons, leaks can develop in localized parts of such structures. Often such a leak is detected after it has become large, leading to unplanned repairs that can take a long time, as equipment, material and personnel need to be mobilized on short notice. Locating the leak is also an important issue. Sometimes the leak cannot be located with a simple visual inspection, requiring the replacement of long sections of the structure. For example, leaks can be of seawater into the structure, which can promote problems, such as corrosion or contamination of hydraulic lines, or leakage of oil or gas out of the structure.

Leakage detection in pipelines is of ever-increasing importance especially with environment and ecological concerns. In addition, from the point of view of the operator, there are severe consequences for a company's reputation resulting from a leak, and indeed potential liabilities.

Broadly speaking, leakage detection systems can be classified into two groups: hardware-based methods and software-based methods. Hardware-based methods are generally those with dedicated sensors, which respond directly to the existence of a leak. Specific examples are optical or semiconductor gas detectors, e.g., 'sniffers', acoustic sensors or DTS (Distributed Temperature Sensors), DSTS (Distributed Strain and Temperature Sensor) and DVS (Distributed Vibration Sensor), which is also referred to as CRN (Coherent Rayleigh Noise), its underlying technology, or as DAS (Distributed Acoustic Sensing) technologies. A DSTS is based on Brillouin scattering where a frequency shift of 10-12 GHz at an optical probe wavelength of 1550 nanometers is temperature and strain sensitive.

Two earlier patent applications: U.S. Patent Application No. 60/990,147 filed on 26 Nov. 2007 (which is a priority application of WO/2009/070769) and GB Patent Application No. GB0811705.3 filed on 26 Jun. 2008, disclose DTS type measurements.

U.S. 60/990,147 is concerned with a leak detection system having a sensor placed in a space defined between a first barrier to a first fluid and a second barrier to a second fluid. The sensor is used to detect the presence of the first or second fluid in the space due to a leak in the respective first or second barrier. If a leak is detected a signal is generated.

GB0811705.3 is concerned with improving the accuracy of the fluid leak detection of U.S. 60/990,147 by having a fibre optic sensor configured to measure an acoustic emission, wherein a fluid leak produces the acoustic emission. The system is configured to estimate the orifice diameter of the fluid leak based on the measured one or more characteristics and to calculate a leak rate based on the estimated orifice diameter.

Software-based methods normally consist of software packages using a combination of inputs from discrete sensors at various positions along a pipeline, for example provided by a SCADA (Supervisory Control & Data Acquisition) system. Specific examples are flow/pressure change detection, computational mass balance and pressure point analysis.

A disadvantage of such software-based methods is that they are also typically reliant on data from discrete sensors for monitoring pipeline parameters such as flow, temperature and pressure. In such systems, typically assumptions of uniformity along a pipeline, particularly of temperature, are needed. However, any deviations from such assumed uniformity can lead to errors.

Moreover, certain software-based techniques such as the mass-volume type method rely on measuring the difference in volume between the fluid input to the pipe and the output from the pipe to determine the leakage rate of flow. However, the temperature along the length of the pipe is likely to vary, particularly for exceptionally long pieces of pipeline passing through different environments, and known techniques do not accurately account for such variations.

Accordingly, there exists a need in the art to overcome the deficiencies and limitations described hereinabove.

SUMMARY

In a first aspect of the invention, a system is provided that comprises a measurement device configured to measure a distributed temperature along a length of the conduit. The system further comprises a processor configured to calculate a change in volume of the fluid in the conduit for each of a plurality of sections of the length of the conduit based on the distributed temperature. The processor is further configured to calculate a correction factor based on the change in volume of the fluid. The processor is also configured to calculate a corrected mass-balance differential using the correction factor, and compare the corrected mass-balance differential to a predetermined leakage threshold to identify whether a leak exists in the conduit.

The system may also comprise another measurement device configured to measure a distributed acoustic signal along the length of the conduit. The processor may be further configured to compare the distributed acoustic signal to the result of the comparison of the corrected mass-balance differential and the predetermined leakage threshold to identify whether the leak exists in the conduit.

In another aspect of the invention, a method is provided for identifying a leak in a conduit, the method comprising the step of obtaining a distributed temperature using a measurement device along a length of the conduit. The method further comprising calculating a change in volume of a fluid in the conduit for each of a plurality of sections of the length of the conduit based on the distributed temperature. The method further comprising calculating a correction factor using a processor based on the change in volume. The method also comprising calculating a corrected mass-balance differential using the correction factor, and comparing the corrected mass-balance differential to a predetermined leakage threshold to identify whether a leak exists in the conduit.

The method may also comprise obtaining a distributed acoustic signal along the length of the conduit. The method may further comprise comparing the distributed acoustic signal to the result of the comparison of the corrected mass-balance differential and the predetermined leakage threshold to identify whether the leak exists in the conduit.

In another aspect of the invention, a computer program product is provided comprising a computer-usable storage medium having readable program code embodied in the storage medium. The computer program product includes at least one component operable to obtain a distributed temperature using a measurement device along a length of a conduit. The at least one component is further operable to calculate a change in volume of a fluid in the conduit for each of a plurality of sections of the length of the conduit based on the distributed temperature. The at least one component is further operable to calculate a correction factor based on the change in volume of the fluid. The at least one component is also operable to calculate a corrected mass-balance differential using the correction factor, and compare the corrected mass-balance differential to a predetermined leakage threshold to identify whether a leak exists in the conduit.

The computer program product may be further operable to obtain a distributed acoustic signal along the length of the conduit. The at least one component may be further operable to compare the distributed acoustic signal to the result of the comparison of the corrected mass-balance differential and the predetermined leakage threshold to identify whether the leak exists in the conduit.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to a system and method for identifying a leak and, more particularly, to a system and method for more accurately and consistently identifying and measuring the quantity of leakage from a conduit used in the conveyance of a fluid, such as a hydrocarbon fluid, for example oil, or a gas, such as natural gas.

The structures, which can be the subject of this invention, can include any suitable structures, wherein detection of leaks is needed, such as any conduit, which may include a subsea pipe, subsea structure, e.g., a flexible pipe, such as a flexible riser or an umbilical. Such structures are known in the art, see, e.g., U.S. Pat. Nos. 7,296,480 and 5,918,641, incorporated herein by reference. A pipe or pipeline on surface of earth may also be subject of this invention.

The methods, which can be the subject of this invention, include mass-balance techniques that rely on comparing the mass flowing into a conduit, e.g., a pipeline, with the mass flowing out of the conduit. In particular, mass-balance techniques rely on the principle of conservation of mass. In the steady state, the mass flow $M_1$ entering a leak-free pipeline will balance the mass flow $M_2$ leaving the pipeline; any drop in mass leaving the pipeline (mass imbalance $M_1$-$M_2$) indicates a possible leak. Mass-balancing methods typically measure $M_1$ and $M_2$ using flowmeters and compute the imbalance, which is an estimate of the leak flow. The imbalance (typically monitored over a number of time periods) can be compared against a leak alarm threshold to generate an alarm indicative of a leak. Given that typically large volumes are conveyed continuously through the pipeline, the task of a system is to detect very small differences between the input and output flow. Thus, to detect a leakage in the pipeline requires an accurate differential measurement of mass flow rates and requires the flowmeters to have extremely good resolution and long-term stability.

However, given that flowmeters are accurate to about 0.1% for raising an alarm on a discrepancy between the input and output, there is little confidence for detection of leaks where the differential is less than approximately 1%. Leaving such leaks undetected for months can result in a significant loss of product, environmental hazards (methane being a stronger greenhouse gas than carbon dioxide) and of course a potential major explosion hazard. With oil pipelines conveying large volumes of crude (for example, 1 million barrels/day) a leak of even a fraction of 1% represents a major pollution issue as well as a significant loss of product transported.

Figure 1:
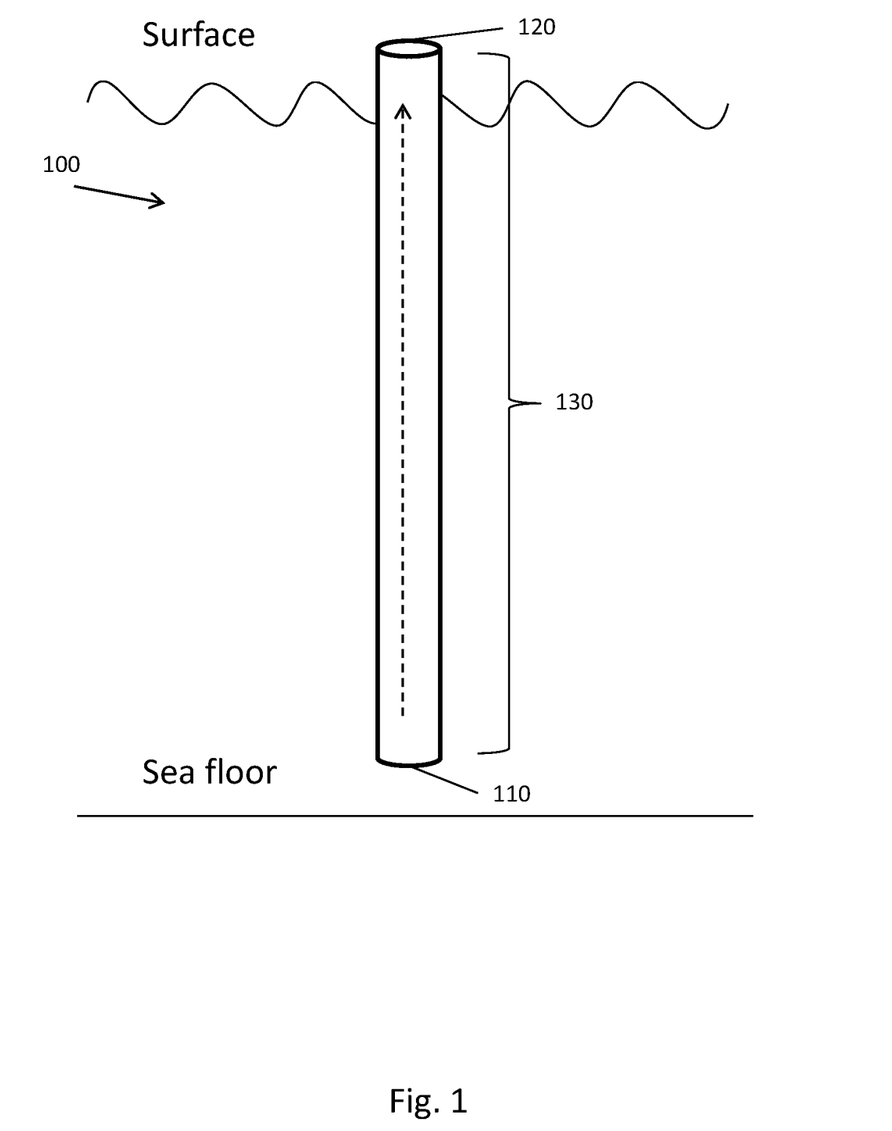
FIG. 1 shows schematically a standard pipeline (also referred to herein as a "pipe") for conveying hydrocarbon fluids.

FIG. 1 shows a general pipeline 100 for conveying fluid, such as a hydrocarbon fluid e.g., oil and/or gas, from the sea floor to the surface. Specifically, the pipeline 100 is shown as having an entrance point 110 into which fluid enters and an exit point 120 out of which the fluid leaves the pipeline. In between the entrance point 110 and the exit point 120 is the main section 130 of the pipeline 100, which at any point in time will store a particular volume of fluid.

One of the sources of uncertainty in mass-balance systems is the relationship between mass and volume, which is determined by temperature. While it is routine to measure the temperature at the entrance point 110 and the exit point 120 of the pipeline 100, such measurements do not help determine the volume stored in the main section 130 of the pipeline 100, whose length may be subject to temperature variations as the pipeline 100 extends from the sea floor to the surface.

For example, in the case of a long pipeline 100 it may take several days for a slug of oil to be conveyed from the entrance point 110 to the exit point 120. Thus, with the potential for temperature variation anywhere along the entire length of the pipeline, e.g., main section 130, there is a source of uncertainty, which is introduced into the estimate of the mass differential obtained by the mass-balancing methods. This uncertainty establishes the limits of the magnitude of the leak that can be detected, or in other words, the uncertainty directly raises the minimum leak size that triggers an alarm for a given requirement on false alarm rates.

Furthermore, general mass-balance systems that use a software-based method of determining the mass balance differential, and thus the leakage, rely on an assumption of uniformity of temperature between adjacent sensors. For example, a general mass-balance system may have a sensor located at the entrance point 110 and the exit point 120, and the temperature over the entire pipeline length between the two points is considered to be uniform. Such an assumption limits the resolution of the leakage detection and in other cases produces errors, which can manifest as false positives or false negatives.

In order to overcome this uncertainty, aspects of the present invention are concerned with obtaining a distributed (or continuous) temperature measurement along the length of the pipeline. The distributed temperature measurement data serves two main purposes. First, it provides information regarding thermal anomalies along a length of a pipeline. For example, a localized leak will generate a localised thermal anomaly under appropriate conditions either through the escape of fluid with a temperature different from its immediate surroundings or by the localised Joules-Thompson cooling arising from rapid expansion of escaping high-pressure gasses. Second, in embodiments, the distributed temperature measurement data can be implemented into a software-based leak detection system, thereby improving the accuracy of such systems.

Therefore, an embodiment of the invention is concerned with the replacement of (or addition to) discrete temperature measurements at the entrance point and the exit point of a pipeline with distributed (or continuous) temperature data along the length of the pipeline. As a result, not only is the reliability of the conventional leak detection technology enhanced, but the output can be combined with a leak detection decision based on temperature and acoustic detections from the distributed (also referred to as continuous) sensors for even greater confidence and the combined benefits of the different leak detection technologies.

Advantageously, embodiments of the invention improve the ability to detect an early leak in the pipeline by reducing the uncertainty in the mass-balance and consequently enable the alarm threshold to be reduced. Even more advantageously, embodiments of the invention improve the ability to detect an early leak in the pipeline by using local temperature and acoustic signals to warn of a leak, which can be validated by an indication from a global system monitoring the conduit, e.g., the pipeline, while the leak is still below a safe threshold for alarming based on the global system's own monitoring data.

The present invention may be embodied as a system, method, or in conjunction with a computer program product executable by a computer-readable medium. The present invention may include a hardware embodiment, a software embodiment or a combination of software and hardware embodiments. Furthermore, the present invention may include a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Figure 2:
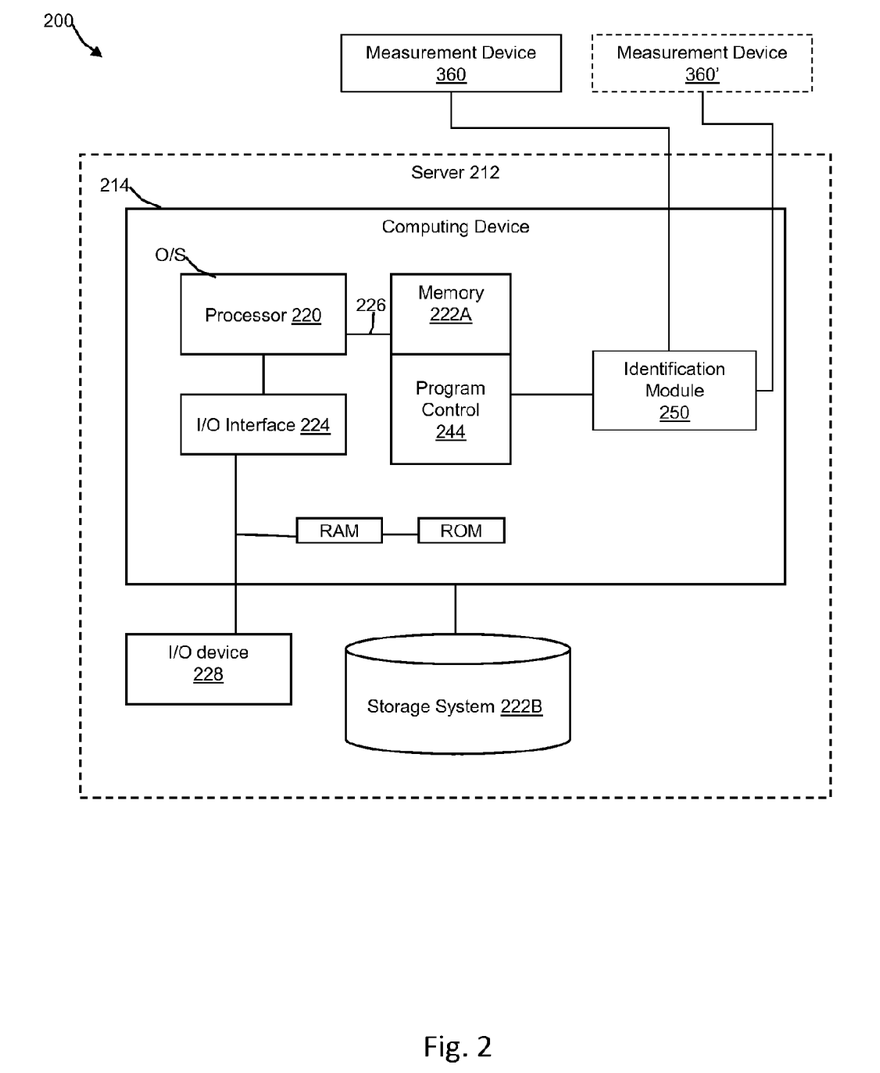
FIG. 2 is an illustrative external environment for implementing the invention in accordance with aspects of the invention.

FIG. 2 shows an illustrative environment 200 for managing the processes in accordance with the invention. The environment 200 includes a server or other computing system 212 that can perform the processes described herein. The server 212 includes a computing device 214, which can be resident on a network infrastructure or computing device. The computing device 214 includes a processor 220, memory 222A, an I/O interface 224, and a bus 226. In addition, the computing device 214 includes random access memory (RAM), a read-only memory (ROM), and an operating system (O/S).

The computing device 214 is in communication with an external I/O device/resource 228 and a storage system 222B. The I/O device 228 can comprise any device that enables an individual to interact with the computing device 214 (e.g., user interface) or any device that enables the computing device 214 to communicate with one or more other computing devices using any type of communications link.

The processor 220 executes computer program code (e.g., program control 244), which can be stored in the memory 222A and/or storage system 222B. While executing the computer program code, the processor 220 can read and/or write data to/from memory 222A, storage system 222B, and/or I/O interface 224. The program code executes the processes of the invention such as comparing a corrected mass-balance differential to a predetermined leak threshold to determine whether a leak in the pipeline has occurred, as will be discussed below.

The computing device 214 includes an identification module 250 that may be a portion of the computer program code. Alternatively, the identification module 250 may be located in computer program code of another computing device. By way of non-limiting example, the identification module 250 can be located on a client device, a third-party service provider, or a public or private server. Further, for example, the identification module 250 can be implemented as the following:
- a Graphical User Interface (GUI) application in a client device that can translate GUI commands into text-based commands;
- a standalone application in a client device;
- a gadget on a computer desktop or in a web site;
- a web site;
- an instant messaging client that communicates directly with a system server;
- an instant messaging web-based client that communicates directly with a system server;
- a Wireless Access Point (WAP) interface;
- an e-mail interface; and/or
- a Really Simple Syndication (RSS) interface.

The identification module 250 communicates with one or more measurement devices 360/360' in order to carry out processes of the invention. For example, the one or more measurement devices 360/360' can obtain a temperature profile along the length of a pipeline from the distributed (or continuous) temperature measurements. The identification module 250 can use the temperature profile to compute a volume for different sections of the pipeline based on distributed temperature measurements; calculate a correction factor based on the determined volume of the different sections of the pipeline; apply the correction factor to a calculated mass-balance differential; and compare the corrected mass-balance differential to a predetermined leak threshold to determine whether a leak in the pipeline has occurred. Furthermore, the identification module 250 can be its own dedicated special processor.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, to transform the general purpose computer into a special purpose computer, such that the instructions, which execute via the processor of the computer, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
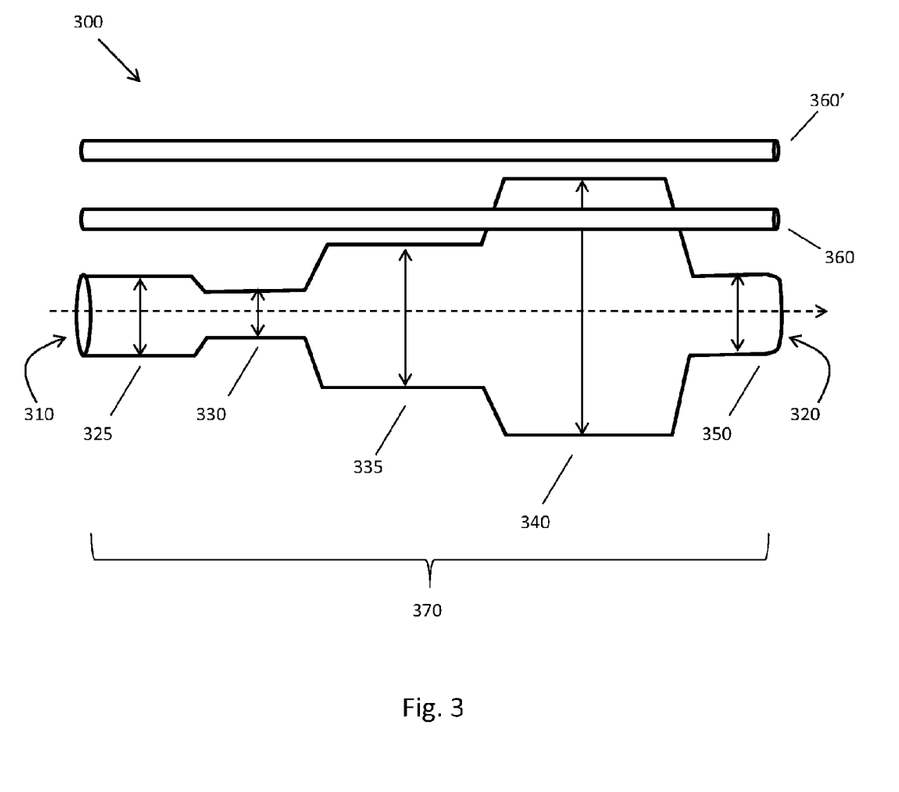
FIG. 3 shows schematically a pipeline with various deformations in its volume due to temperature variations along the length of the pipe.

FIG. 3 shows an exemplary pipeline 300 in accordance with aspects of the invention. Specifically, FIG. 3 shows schematically a blown-up version of the pipeline 300 having an entrance point 310 into which fluid (e.g., liquid and/or gas) enters and an exit point 320 out of which the fluid leaves the pipeline. Further, FIG. 3 emphasizes potential volume variations along sections of pipeline 300 as the pipeline 300 encounters various temperature environments. The fluid flowing through the pipe could have different temperatures along its length or the surrounding conditions might heat up or cool down a section or volume of the pipeline 300. Thus, while FIG. 3 is shown as a distorted pipe for ease of understanding, FIG. 3 illustrates how various sections 325, 330, 335, 340, and 350 of the pipeline 300 will store different volumes of fluid, because of the relationship between mass, temperature, and volume. For example, section 340 has the largest volume, as a result of being exposed to a different, likely higher, temperature, as compared to the other sections 325, 330, 335, and 350 of the pipeline 300.

FIG. 3 also shows, in accordance with aspects of the invention, a measurement device 360 that provides a temperature profile for a main section 370 of the pipeline 300 with a resolution of about one to ten meters. Specifically, the measurement device 360 detects and reports the fluid temperature in a distributed (or continuous) manner along the length of the main section 370 of the pipeline 300. In embodiments, the measurement device 360 may additionally comprise laser sources, modulators, receivers and acquisition electronics, in conjunction with processing and memory circuitry to calculate the value of a measurement.

In accordance with aspects of the invention, the measurement device 360 may be a fibre optic cable running the length of the main section 370 of the pipeline 300. More specifically, the measurement device 360 may be a sensing fiber, e.g., an optical fiber (see, e.g., PCT/US2008/085042 and PCT/US2009/048878, incorporated herein by reference). For example, light may be sent through an optical fibre positioned within the entire length of the pipeline, changes in stresses on the sensing fiber can be measured by measuring changes in the wavelength of the light returned by the fibre, the changes in wavelength of the light returned can be used to calculate the temperature along the pipeline, and temperature anomalies can be correlated to the presence of a leak in the pipeline. In addition, changes in the intensity of wavelength-shifted light returning by the optical fibre can also provide information on primarily the temperature, but in some cases also the strain on the optical fibre. For example, in accordance with aspects of the invention, this can be done by using any suitable known techniques, which can measure the change in stress and the corresponding changes in the optical characteristics of the sensing fiber, including distributed (e.g., using optical frequency domain reflectometry) or multipoint sensor techniques, detection of change in attenuation or index of refraction of the optical fiber, optical time domain reflectometer (OTDR) or frequency domain techniques for detecting changes in the optical fiber, optical interferometer techniques, Brillouin, Raman or Rayleigh scattering, or a fiber Bragg grating techniques, and similar techniques.

A range of optical fibre distributed sensing technologies exists for applications in condition monitoring of terrestrial gas and oil pipelines. Moreover, technologies such as Raman OTDR (Optical Time Domain Reflectometer), Brillouin OTDR and CRN (Coherent Rayleigh Noise) technologies are finding application in monitoring of pipelines for conditions including pipeline leaks. Such techniques can be used for interrogation of an optical sensing cable, and may incorporate remote optical amplification to achieve an unprecedented detection range of 100 km per channel. In particular, the Raman and Brillouin OTDR technologies, when connected to an optical sensor cable deployed close to the pipeline to be monitored, can report the fluid temperature in a continuous manner along the entire length of the pipeline, as opposed to reporting the fluid temperature at discreet, preselected points in the pipeline. Any technologies, which include the optical sensor cable inside the pipeline or attached to the outside of the pipeline, can also report the fluid temperature in a continuous manner along the entire length of the pipeline.

It should be appreciated that such measurement devices are known to persons skilled in the art and, for example, may include the techniques described in the earlier patent applications U.S. 60/990,147 and GB0811705.3, incorporated herein by reference.

FIG. 3 also shows, in accordance with an alternative embodiment, another measurement device 360' that provides different distributed measurements using a different distributed sensing technology. In accordance with aspects of the invention, the measurement device 360' may also be a fibre optic running the length of the main section 370 of the pipeline 300. However, the measurement device 360' uses acoustics to determine the location of a leak in the pipeline 300. Moreover, in accordance with aspects of the invention, the measurement device 360 and measurement device 360' may be combined in a single fibre optic cable to provide both optic and acoustic distributed measurements.

More specifically, the measurement device 360' may be a sensing fiber, e.g., an optical fiber (see, e.g., PCT/US2008/085042 and PCT/US2009/048878, incorporated herein by reference). For example, fluid, i.e., liquid and/or gas, leaks are expected to give rise to acoustic emissions having characteristic frequencies dependent upon factors such as: oil or gas pressure and composition; pipe bore diameter; leak orifice diameter and shape/profile; and/or backfill properties (e.g., including depth of backfill, permeability, particle size distribution, moisture content, material composition, and the like). The monitoring of the acoustic signature of the leak, to detect the location and estimate the leak flow rates can be carried out with an optical fiber configured as a distributed interferometer.

The measurement devices 360 and 360' may be included in the system of the invention in any suitable location, such as in the interior of the conduit, e.g. a pipe or a pipeline, or on the outside of the conduit.

Figure 4:
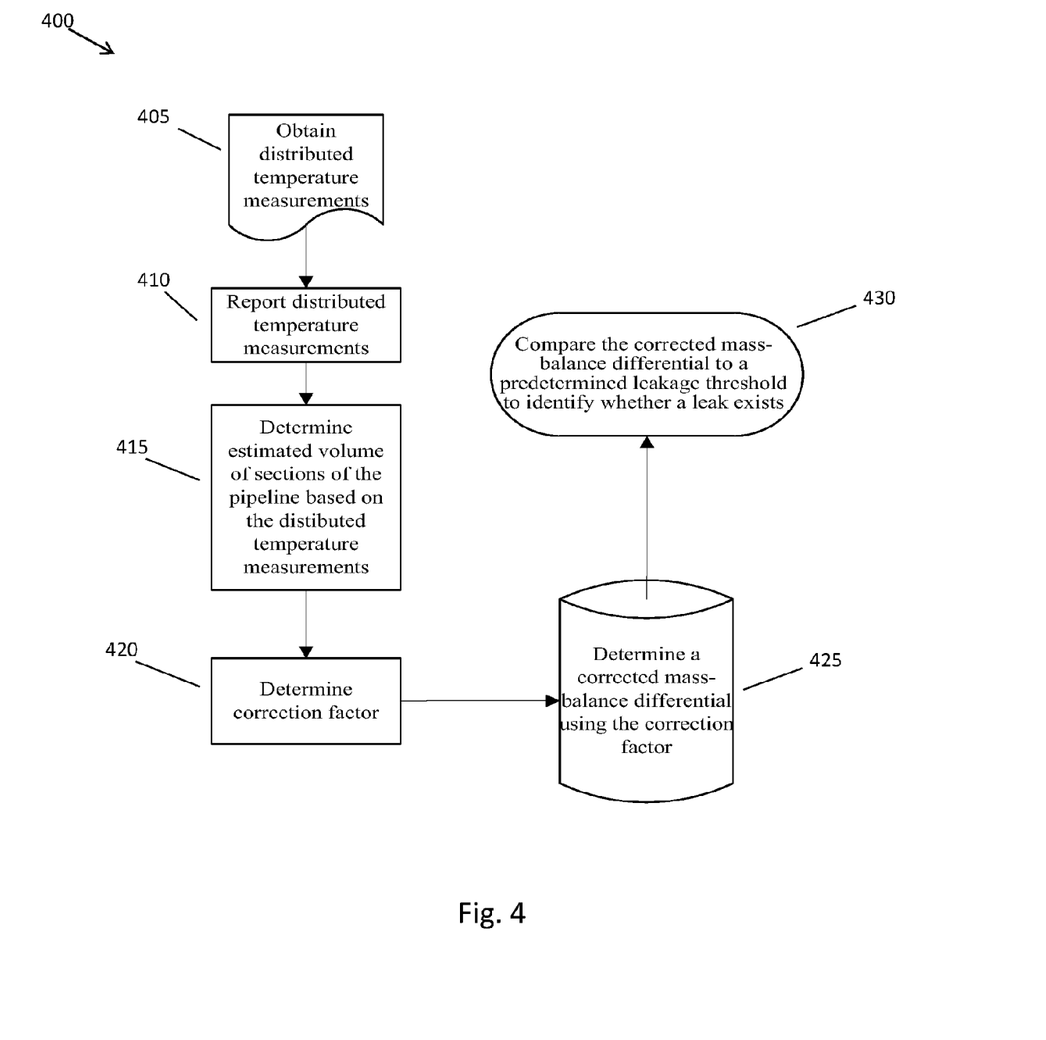
FIG. 4 is a flow diagram of processes in accordance with aspects of the invention.
Figure 5:
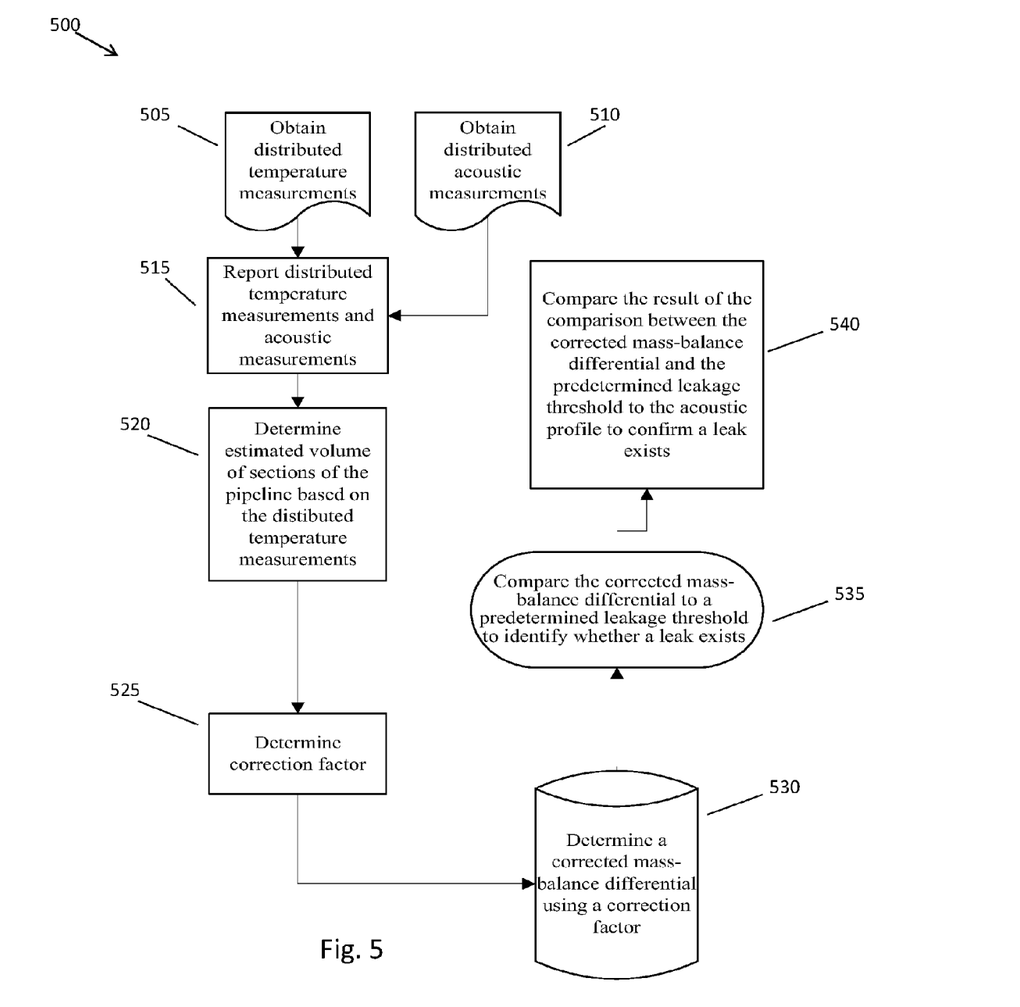
FIG. 5 is an alternative flow diagram of processes in accordance with aspects of the invention.

FIGS. 4 and 5 show exemplary flow diagrams for performing aspects of the present invention. The steps of FIGS. 4 and 5 may be implemented in the environment of FIG. 2, for example. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose computer hardware-based systems that perform the specified functions or acts, or combinations of special purpose hardware and computer instructions.

FIG. 4 shows an invention process/system 400 for the identification of a leak in the pipeline 300, as discussed in conjunction with FIG. 3. At step 405, a distributed (or continuous) temperature measurement of the pipeline 300 is obtained using the measurement device 360. Specifically, the measurement device 360 obtains a temperature profile along the length of main body 370 of the pipeline 300. In accordance with aspects of the invention, a continuous temperature profile of the measurements is provided, e.g., the process of sampling the temperature profile by a digital acquisition system converts the sampling into discrete sampling points; however, the underlying physical input is continuous. Advantageously, since the measurement device 360 provides for distributed (or continuous) temperature measurements along the length of the main body 370, it is not necessary to assume that the temperature between sensors on the pipeline is uniform.

At step 410, the obtained temperature profile is sent to the identification module 250, as discussed in conjunction with FIG. 2. At step 415, the identification module 250, determines an estimated change in volume of a number of sections representative of the length of a conduit, e.g., sections 325, 330, 335, 340, and 350 of pipeline 300, based on the temperature profile. At step 420, the identification module 250 uses a correction algorithm to calculate a correction factor based on the determined change in volume of the number of sections.

In accordance with aspects of the invention, the estimate of a leak rate in a mass balance system is based on {Mass out}−{mass in}−{change in volume stored by the pipe, ΔV}. Mass flowmeters, can be corrected locally for temperature and pressure changes along the pipeline 300; however, the estimate of volume stored requires a temperature profile. Therefore, in accordance with aspects of the invention, the temperature profile is used to estimate a thermal expansion for each point along the pipeline 300, i.e., section of the pipeline 300, and thus the change in volume that is held within the pipeline 300. For example, in steps 415 and 420 the temperature profile may be used to estimate the change in the volume of the fluid in the pipeline 300, e.g., oil, compressed natural gas, or any other fluid, using the following equation:

$$\Delta V = \int_0^L [Kp - Kv] \cdot \Delta T(z) \cdot dz \quad (1)$$

For example, the change in volume stored by the pipe is given by change in the temperature at each incremental local dz, i.e., each section of the pipeline 300, multiplied by the difference between the volume expansion of the pipe Kp and that of the fluid Kv, integrated over the entire length of the pipe (0-L).

Accordingly in an embodiment, the process involved in the estimation of the change in volume comprises: acquiring input and output mass flows from the entrance point 310 and the exit point 320 of the pipeline 300; acquiring a temperature profile of the pipeline 300 along its entire length (or along a predetermined length of the pipeline 300); using known properties of the fluid, e.g., volume expansion coefficient, and of the pipeline 300, e.g., diameter and linear coefficient of expansion, to calculate local change in stored volume for each section of the pipeline 300 relative to a predetermined baseline value, e.g., a baseline value taken when the fluid is not flowing within the pipeline 300; and integrate the change in volume along the entire length or the predetermined length of the pipeline 300 to calculate a cumulative change in volume stored, i.e., a correction factor.

At step 425, the difference between the mass flows in and out of the pipeline 300 is corrected using the calculated change in volume stored, i.e., the correction factor. At step 430, the corrected mass-balance differential is compared to a predetermined leakage threshold to identify whether a leakage has occurred within the pipeline 300. Advantageously, the corrected mass balance differential improves the ability to detect an early leak in the pipeline by reducing the uncertainty in the mass balance and consequently enables the alarm threshold to be reduced.

Moreover, the invention process/system 400 should be understood as being carried out in a substantially real-time manner, such that the distributed temperature profile of the pipeline is constantly kept up to date, allowing a more accurate estimate of the volume of fluid traversing the different sections of the pipeline, and in turn results is a more accurate leakage detection mechanism that advantageously takes into account a changing environment.

FIG. 5 shows an alternative invention process/system 500 for the identification of a leak in the pipeline 300, as discussed in conjunction with FIG. 3. At step 505, distributed temperature measurements of the pipeline 300 are obtained using the measurement device 360. Specifically, the measurement device 360 obtains a temperature profile along the length of the main body 370 of the pipeline 300. Advantageously, since the measurement device 360 provides for distributed temperature measurements along the length of the main body 370, it is not necessary to assume that the temperature between sensors on the pipeline is uniform.

At step 510, distributed acoustic measurements of the pipeline 300 are obtained using the measurement device 360'. Specifically, the measurement device 360' obtains an acoustic profile along the length of main body 370 of the pipeline 300.

At step 515, the obtained temperature profile (i.e., distributed (or continuous) temperature measurements) and acoustic profile are sent to the identification module 250, as discussed in conjunction with FIG. 2. At step 520, the identification module 250 determines an estimated change in volume of a number of sections representative of the length of a conduit, e.g., sections 325, 330, 335, 340, and 350 of pipeline 300, based on the temperature profile. At step 525, the identification module 250 uses a correction algorithm to calculate a correction factor based on the determined change in volume of the number of sections.

In accordance with aspects of the invention, in steps 520 and 525 the temperature profile may be used to estimate the change in the volume of the fluid in the pipeline 300 using the following equation:

$$\Delta V = \int_0^L [Kp - Kv] \cdot \Delta T(z) \cdot dz \quad (2)$$

For example, the change in volume stored by the pipe is given by change in the temperature at each incremental local dz, i.e., each section of the pipeline 300, multiplied by the difference between the volume expansion of the pipe Kp and that of the fluid Kv, integrated over the entire length of the pipe (0-L).

Accordingly in embodiments, the processes involved in the estimation of the change in volume comprises: acquiring input and output mass flows from the entrance point 310 and the exit point 320 of the pipeline 300; acquiring a temperature profile of the pipeline 300 along its entire length (or along a predetermined length of the pipeline 300); using known properties of the fluid, e.g., volume expansion coefficient, and of the pipeline 300, e.g., diameter and linear coefficient of expansion, to calculate local change in stored volume for each section of the pipeline 300 relative to a predetermined baseline value, e.g., a baseline value taken when the fluid is not flowing within the pipeline 300; and integrate the change in volume along the entire length or the predetermined length of the pipeline 300 to calculate a cumulative change in volume stored, i.e., a correction factor.

At step 530, the difference between the mass flows in and out of the pipeline 300 is corrected using the calculated change in the volume stored i.e., the correction factor. At step 535, the corrected mass balance differential is compared to a predetermined leakage threshold to identify whether a leakage has occurred within the pipeline 300. At step 540, the result of the comparison between the corrected mass balance differential and the predetermined leakage threshold is compared to the acoustic profile to confirm and add confidence to whether a leakage of pipeline 300 truly occurred.

Advantageously, the corrected mass balance differential improves the ability to detect an early leak in the pipeline by reducing the uncertainty of the mass balance and consequently enables the alarm threshold to be reduced. Even more advantageously, embodiments of the invention improve the ability to detect an early leak in the pipeline by using local temperature and acoustic signals to warn of a leak, which can be validated by an indication from a global system monitoring the conduit, e.g., the pipeline, while the leak is still below a safe threshold for alarming based on the global system's own monitoring data. Accordingly, using both temperature and acoustic distributed measurements in conjunction with a global system, e.g., a software-based system, offers the prospect of leak detection based on three detection means: temperature data, acoustic detections, and software-based systems.

Moreover, the invention process/system 500 should be understood as being carried out in a substantially real-time manner, such that the distributed temperature profile and distributed acoustic profile of the pipeline are constantly kept up to date, allowing a more accurate estimate of the volume of fluid traversing the different sections of the pipeline, which results in a more accurate leakage detection mechanism that advantageously takes into account a changing environment.

As should be understood by one of skill in the art of leakage detection, the invention process/systems 400 and 500 provide for different distributed measurements that may be combined to improve the sensitivity of leakage detection. Additionally, as should also be understood by one of ordinary skill in the art of leakage detection, the different distributed measurements may also be used to further improve the accuracy of detecting a leak's location. For example, the location of the leak, rupture or impact can be detected using optical time domain reflectometer (OTDR) or frequency domain techniques.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, group of elements, components, and/or groups thereof.

Language such as "including," "comprising," "having," "containing," or "involving," and variations thereof, is intended to be broad and encompass the subject matter listed thereafter, as well as equivalents, and additional subject matter not recited. Further, whenever a composition, a group of elements, process or method steps, or any other expression is preceded by the transitional phrase "comprising", "including" or "containing", it is understood that it is also contemplated herein the same composition, group of elements, process or method steps or any other expression with transitional phrases "consisting essentially of", "consisting", or "selected from the group of consisting of", preceding the recitation of the composition, the group of elements, process or method steps or any other expression.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A system for identifying a leak in an oilfield conduit made up of a plurality of conduit sections, the system comprising:
   a measurement device deployed along a length of the conduit traversing each of the sections and configured to measure a distributed temperature along the length of the conduit; and
   a processor configured to:
   calculate a change in volume of a fluid in the conduit for each of the plurality of sections based on the distributed temperature obtained from the device;
   calculate a correction factor based on the change in volume of the fluid;
   calculate a corrected mass-balance differential using the correction factor; and
   compare the corrected mass-balance differential to a predetermined leakage threshold to identify whether a leak exists in any of the sections of the conduit.

2. The system of claim 1, further comprising another measurement device configured to measure a distributed acoustic signal along the length of the conduit, wherein the processor is further configured to compare the distributed acoustic signal to the result of the comparison of the corrected mass-balance differential and the predetermined leakage threshold to identify whether the leak exists in the conduit.

3. The system of claim 1, wherein the calculation of the correction factor comprises:
   acquiring an input and output mass flow from an entry point and exit point of the conduit, respectively;
   using known properties of the fluid and the conduit to calculate the change in volume for each of the plurality of sections of the conduit relative to a predetermined baseline; and
   integrating the changes in volume for each of the plurality of sections to calculate a total change in volume of the conduit, wherein the total change in volume of the conduit is the correction factor.

4. The system of claim 3, wherein the known properties of the fluid comprise a volume expansion coefficient and the known properties of the conduit comprise a diameter of the conduit and a linear coefficient of expansion.

5. The system of claim 4, wherein the predetermined baseline value is a baseline of the conduit taken when the conduit is empty of any fluid.

6. The system of claim 5, wherein:
   the total change in volume of the conduit is calculated using the formula:
   $\Delta V = \int_0^L [K_p - K_v] \cdot \Delta T(z) \cdot \partial z$; and
   the change in volume stored ($\Delta V$) by the conduit is given by a change in temperature ($\Delta T$) provided by the distributed temperature at each of the plurality of sections (dz) of the conduit, multiplied by the difference between a volume expansion of the conduit ($K_p$) and that of the fluid ($K_v$), integrated over a predetermined length (0-L) of the conduit.

7. The system of claim 6, wherein the measurement device is an optical fibre.

8. The system of claim 7, further comprising another measurement device configured to measure a distributed acoustic signal along the length of the conduit, wherein the processor is further configured to compare the distributed acoustic signal to the result of the comparison of the corrected mass-balance differential and the predetermined leakage threshold to identify whether the leak exists in the conduit.

9. The system of claim 8, wherein the another measurement device is an optical fibre.

10. A method for identifying a leak in an oilfield conduit consisting of a plurality of conduit sections, the method comprising the steps of:
    obtaining a distributed temperature using a measurement device deployed along a length of the conduit traversing each of the sections;
    calculating a change in volume of a fluid over the length of the conduit based on the distributed temperature from each of the plurality of conduit sections;
    calculating a correction factor using a processor based on the change in volume;
    calculating a corrected mass-balance differential using the correction factor; and
    comparing the corrected mass-balance differential to a predetermined leakage threshold to identify whether a leak exists in any of the conduit sections of the oilfield conduit.

11. The method of claim 10, further comprising:
    obtaining a distributed acoustic signal along the length of the conduit; and
    compare the distributed acoustic signal to the result of the comparison of the corrected mass-balance differential and the predetermined leakage threshold to identify whether the leak exists in the conduit.

12. The method of claim 10, wherein the calculating of the correction factor comprises:
   acquiring an input and output mass flow from an entry point and exit point of the conduit, respectively;
   using known properties of the fluid and the conduit to calculate the change in volume for each of the plurality of sections of the conduit relative to a predetermined baseline; and
   integrating the changes in volume for each of the plurality of sections to calculate a total change in volume of the conduit, wherein the total change in volume of the conduit is the correction factor.

13. The method of claim 12, wherein the known properties of the fluid comprise a volume expansion coefficient and the known properties of the conduit comprise a diameter of the conduit and a linear coefficient of expansion.

14. The method of claim 13, wherein the predetermined baseline value is a baseline of the conduit taken when the conduit is empty of any fluid.

15. The method of claim 14, wherein:
   the total change in volume of the conduit is calculated using the formula:
   $\Delta V = \int_0^L [K_p - K_v] \cdot \Delta T(z) \cdot dz$; and
   the change in volume stored ($\Delta V$) by the conduit is given by a change in temperature ($\Delta T$) provided by the distributed temperature at each of the plurality of sections (dz) of the conduit, multiplied by the difference between a volume expansion of the conduit ($K_p$) and that of the fluid ($K_v$), integrated over a predetermined length (0-L) of the conduit.

16. The method of claim 15, wherein the measurement device is an optical fibre.

17. The method of claim 16, further comprising:
   obtaining a distributed acoustic signal along the length of the conduit; and
   compare the distributed acoustic signal to the result of the comparison of the corrected mass-balance differential and the predetermined leakage threshold to identify whether the leak exists in the conduit.

18. A computer program product comprising a non-transitory computer readable medium containing computer instructions stored therein for causing a computer processor to perform, the computer program product includes at least one component operable to:
   obtain a distributed temperature using a measurement device along a length of an oilfield conduit made up of a plurality of conduit sections;
   calculate a change in volume of a fluid in the conduit for each of the plurality of sections based on the distributed temperature;
   calculate a correction factor based on the change in volume of the fluid;
   calculate a corrected mass-balance differential using the correction factor; and
   compare the corrected mass-balance differential to a predetermined leakage threshold to identify whether a leak exists in any of the sections of the conduit.

19. The computer program product of claim 18, further operable to:
   obtain a distributed acoustic signal along the length of the conduit; and
   compare the distributed acoustic signal to the result of the comparison of the corrected mass-balance differential and the predetermined leakage threshold to identify whether the leak exists in the conduit.

20. The computer program product of claim 18, wherein the calculating of the correction factor comprises:
   acquiring an input and output mass flow from an entry point and exit point of the conduit, respectively;
   using known properties of the fluid and the conduit to calculate the change in volume for each of the plurality of sections of the conduit relative to a predetermined baseline; and
   integrating the changes in volume for each of the plurality of sections to calculate a total change in volume of the conduit, wherein the total change in volume of the conduit is the correction factor.

* * * * *